United States Patent [19]

Fukada

[11] Patent Number: 5,206,768
[45] Date of Patent: Apr. 27, 1993

[54] METHOD AND APPARATUS FOR WRITING VIDEO SIGNAL IN MEMORY

[75] Inventor: Shigekazu Fukada, Tokyo, Japan

[73] Assignee: Fuji Photo Film Co., Ltd., Kanagawa, Japan

[21] Appl. No.: 757,016

[22] Filed: Sep. 9, 1991

[30] Foreign Application Priority Data

Sep. 28, 1990 [JP] Japan .................................. 2-257017

[51] Int. Cl.$^5$ .............................................. H04N 5/78
[52] U.S. Cl. ................................... 360/36.2; 358/339
[58] Field of Search ................... 360/36.2, 36.1, 33.1, 360/32, 38.1, 61; 358/158, 159, 335, 337, 339, 320

[56] References Cited

U.S. PATENT DOCUMENTS

| | | | |
|---|---|---|---|
| 4,214,262 | 7/1980 | Mizukami | 360/36.2 X |
| 4,853,914 | 8/1989 | Okano et al. | 360/36.2 X |
| 4,977,462 | 12/1990 | Takanashi et al. | 360/36.2 X |

Primary Examiner—Andrew L. Sniezek

[57] ABSTRACT

An Apparatus and method of writing a video signal in a memory is provided in an apparatus of the type in which an analog video signal read from a magnetic recording medium is converted into digital image data that is then written in the memory, wherein the operation of a circuit which generates a timing clock signal for converting the video signal into the digital image data and for writing the digital image data in the memory is synchronized at every horizontal synchronizing signal separated from the video signal by application of a trigger signal. The apparatus and method includes enabling a control of a time constant of an automatic frequency control circuit, to which the horizontal synchronizing signal separated from the video signal is applied, for generating a trigger signal synchronized to the horizontal synchronizing signal and applying this trigger signal to the circuit which generates the timing clock signal, and making the time constant relatively large in the vicinity of a vertical synchronizing signal of the video signal.

2 Claims, 4 Drawing Sheets

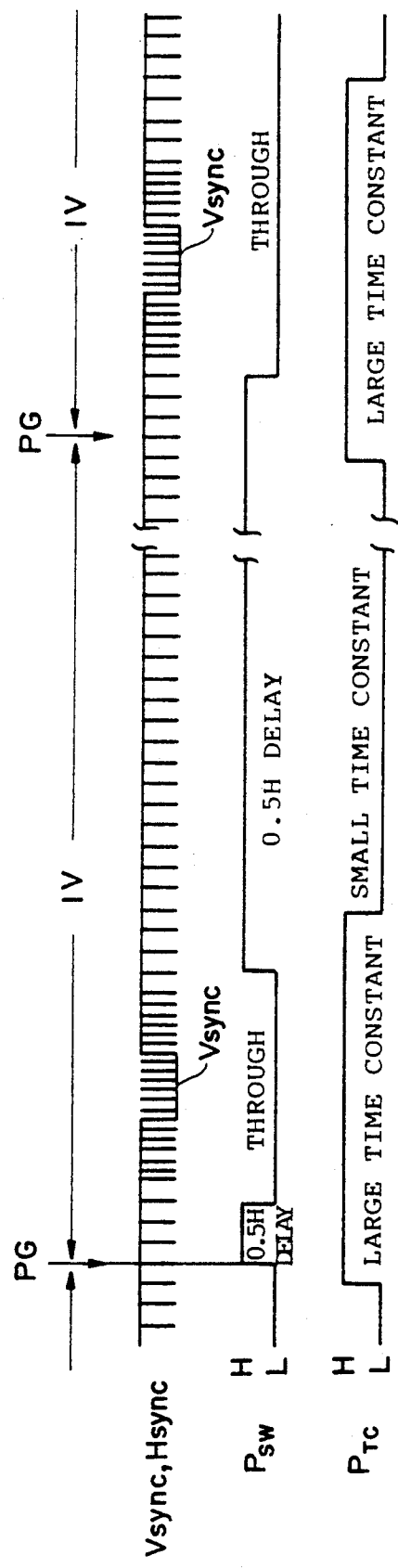

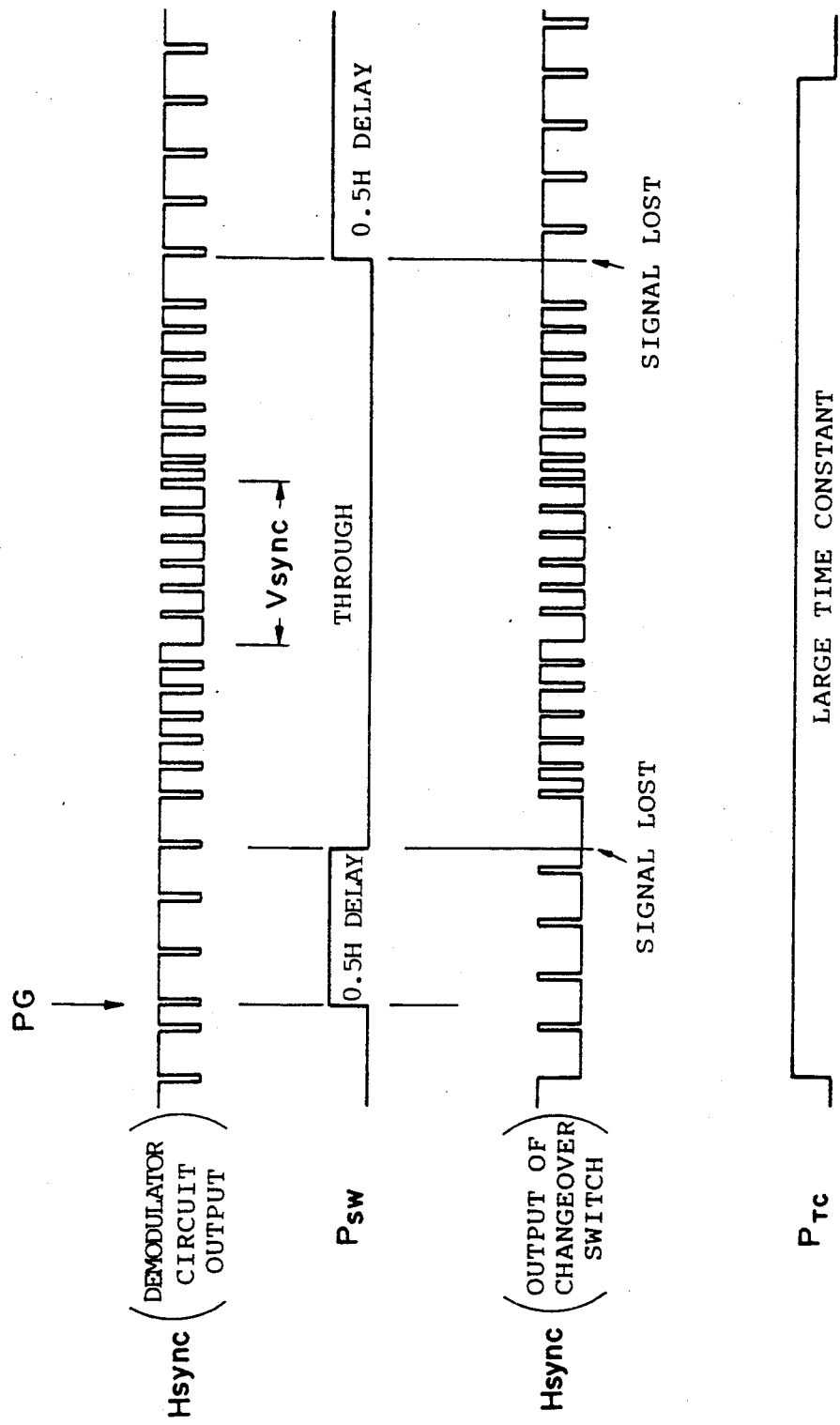

METHOD AND APPARATUS FOR WRITING VIDEO SIGNAL IN MEMORY

BACKGROUND OF THE INVENTION

1. Field of the Invention

This invention relates to a method and apparatus for converting an analog video signal, which has been read from a magnetic recording medium such as a floppy disk or magnetic tape, into digital image data and writing the digital image data in a memory.

2. Description of the Related Art

In order that digital image data produced by A/D-converting an analog video signal read from a magnetic recording medium may be written in a memory while being correctly synchronized to the video signal, a horizontal synchronizing signal is separated and extracted from the video signal and the generation of a timing clock signal or the like for the A/D conversion is synchronized to the horizontal synchronizing signal. More specifically, the horizontal synchronizing signal separated and extracted from the video signal is applied to an automatic frequency controller (also referred to as an "AFC" circuit) including a phase-locked loop (referred to as a "PLL"), a trigger signal tuned to the horizontal synchronizing signal is obtained from the AFC circuit, and the circuit which generates the timing clock signal is reset by the trigger signal. By being reset, the circuit for generating the timing clock signal is returned to the initial state and again generates a series of timing clock signals.

In general, an analog video signal is recorded on a floppy disk, magnetic tape or the like on a field-by-field (or frame-by-frame) basis, and a point of discontinuity is present in the video signal at the boundaries between fields (or frames). The point of discontinuity is in the vicinity of a vertical synchronizing signal, and the point of discontinuity is where the horizontal and vertical synchronizing signals tend to pick up noise. If this noise is applied to the AFC circuit, the latter will more readily generate an erroneous trigger signal as the accuracy of its frequency-control capability (i..e., its capability to follow up an input signal becomes higher). If the circuit which generates the timing clock signal is reset at a point in time other than that at which the horizontal synchronizing signal appears, the writing of the digital image data in the memory will no longer be synchronized to the original analog video signal and the position at which the image data is written in the memory will be adversely affected. If this occurs, a distorted image, for example, will appear when the image data is read out of the memory and reproduced.

In a case where recording by field is performed on a floppy disk (i.e., a case where one frame of an image is recorded in one field), field/frame conversion processing is executed in order to produce a pseudo-frame signal when the recorded image is played back. The video signal read from the floppy disk in field/frame conversion processing is delayed by 0.5 H (where 1 H is the horizontal scanning interval) every other 1 V (the vertical scanning interval). The horizontal synchronizing signal tends to be lost when a changeover is made between the signal delayed by 0.5 H and a through signal (a signal which is allowed to pass without being delayed). As in the case where noise is picked up as mentioned above, the writing of the image data in the memory can no longer be synchronized to the original video signal if the horizontal synchronizing signal is lost.

SUMMARY OF THE INVENTION

An object of the present invention is to make it possible to write digital image data in a memory in correct synchronization with an analog video signal at all times when the analog video signal, which is read from a magnetic recording medium, is converted into the digital image data that is then written in the memory.

According to one embodiment of the present invention, there is provided a method of writing a video signal in a memory in an apparatus in which an analog video signal read from a magnetic recording medium is converted into digital image data that is then written in the memory, wherein operation of a timing clock signal generating circuit which generates a timing clock signal for converting the video signal into the digital image data and for writing the digital image data in the memory is synchronized at every horizontal synchronizing signal separated from the video signal by application of a trigger signal. The method comprises a step of enabling a control of a time constant of an automatic frequency control circuit, to which the horizontal synchronizing signal separated from the video signal is applied, for generating the trigger signal synchronized to the horizontal synchronizing signal and applying the trigger signal to the timing clock signal generating circuit which generates the timing clock signal, and a step of making the time constant relatively large in the vicinity of a vertical synchronizing signal of the video signal.

According to another embodiment of the present invention, there is provided an apparatus for writing a video signal in a memory, comprising an A/D converter circuit for converting an analog video signal read from a magnetic recording medium into digital image data in order to be written in the memory, a timing clock signal generating circuit for controlling A/D conversion timing of the A/D converter circuit, a synchronous separation circuit for separating a horizontal synchronizing signal from the video signal, an automatic frequency control circuit having a variable time constant for generating a trigger signal tuned to the horizontal synchronizing signal, which has been separated by the synchronous separation circuit, at a response speed conforming to the time constant, and resetting the timing clock signal generating circuit by the trigger signal, and control means for controlling a changeover in such a manner that the time constant of the automatic frequency control circuit is made relatively large in the vicinity of a vertical synchronizing signal of the video signal.

In accordance with a further embodiment of the present invention, the time constant of the automatic frequency control circuit which generates the trigger signal for resetting the timing clock signal generating circuit is made relatively large in the vicinity of the vertical synchronizing signal of the analog video signal. At the other portion of the analog video signal (the signal portion representing the image), the time constant is made relatively small. The portion at which noise tends to be produced by discontinuity of the video signal is in the vicinity of the vertical synchronizing signal. In addition, the changeover for the 0.5 H delay in field/frame conversion is carried out, and the portion at which the horizontal synchronizing signal tends to be lost as a result also is in the vicinity of the vertical synchronizing signal. Thereby, time constant of the automatic frequency control circuit is made relatively large in the vicinity of the vertical synchronizing signal, and the frequency follow-up capability of the automatic frequency control circuit declines. Accordingly, even if noise enters as an input, and even if input of the horizontal synchronizing signal is lost, the trigger signal will continue to be generated at the same period by inertia, without being affected by the noise or by loss of the horizontal synchronizing signal. As a result, timing control for writing the digital signal in the memory at the correct period can be carried out even in the vicinity of the vertical synchronizing signal, and writing of subsequently appearing net image data in the memory can be carried out in correct synchronization with the original analog video signal.

In a case where it is attempted to correct a component such as a jitter component when the image data is accepted in the memory based upon the video signal, it is necessary to diminish the time constant of the automatic frequency control circuit. If the time constant is made too small, however, deleterious effects tend to result as from loss of the horizontal synchronizing signal. According to the embodiments of the present invention, problems such as this can be solved satisfactorily.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a time chart showing the overall operation of the automatic frequency control circuit illustrated in FIG. 1; and FIG. 4 is a time chart showing, in an enlarged form, a portion of a vertical synchronizing signal appearing in the time chart of FIG. 3.

DESCRIPTION OF THE PREFERRED EMBODIMENTS

The present invention will now be described in detail with regard to an embodiment in which a video signal that has been field-recorded on a floppy disk is converted into a pseudo-frame signal by a field/frame conversion, and the signal is written in a frame memory upon being subjected to an A/D conversion.

Figure 1:
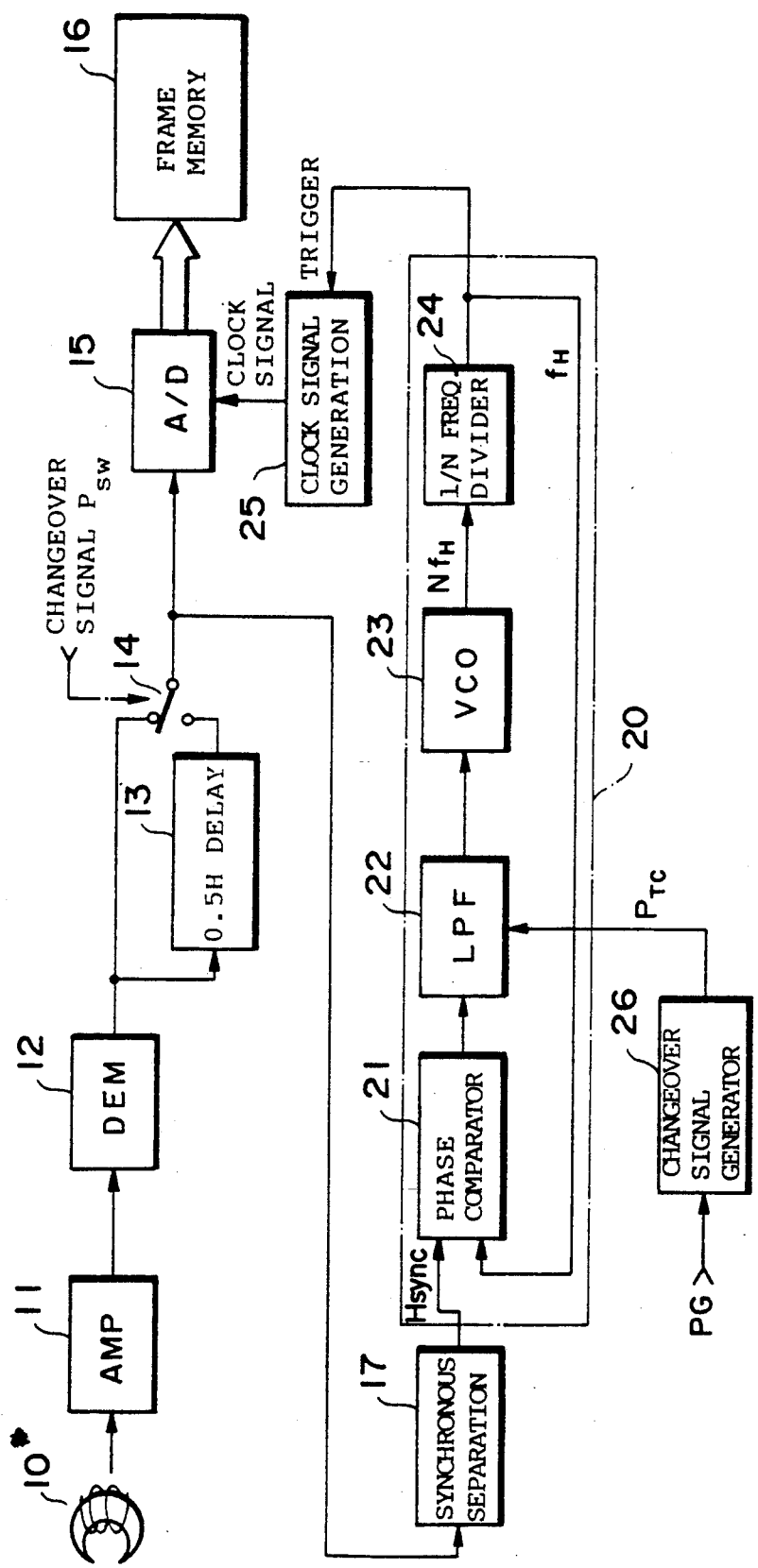
FIG. 1 is a block diagram illustrating the construction of a circuit for reading a field video signal out of a floppy disk and writing the signal in a frame memory for an embodiment of the present invention.
Figure 2:
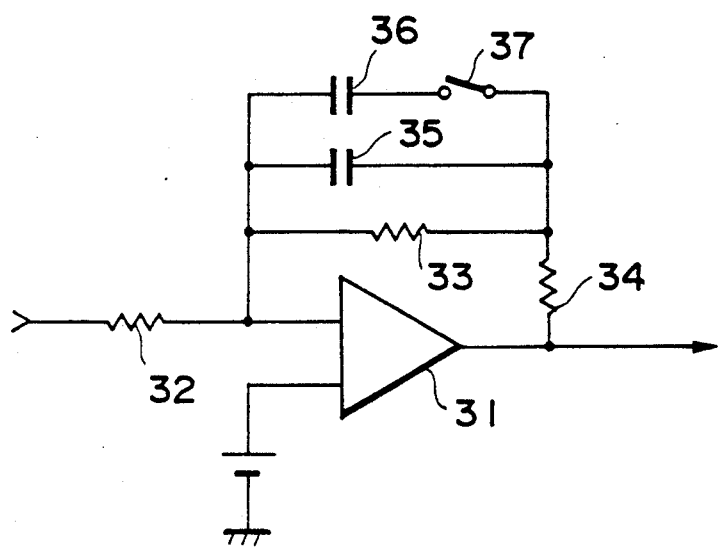
FIG. 2 is a circuit diagram showing an example of the detailed construction of a low-pass filter in an automatic frequency control circuit shown in FIG. 1.

FIG. 1 illustrates the construction of a circuit for reading a field video signal out of a floppy disk and writing the signal in a frame memory. FIG. 2 is a circuit diagram showing an example of the detailed construction of a low-pass filter (hereinafter referred to as an "LPF") in an automatic frequency control circuit (hereinafter referred to as an "AFC") shown in FIG. 1. FIG. 3 is a time chart showing the overall operation of the AFC illustrated in FIG. 1, and FIG. 4 is a time chart showing, in an enlarged form, a portion of a vertical synchronizing signal appearing in the time chart of FIG. 3.

The field video signal recorded on the floppy disk is read by a magnetic head 10, the read signal is directed through an amplifier 11 for frequency demodulation by a demodulator circuit 12, and the resulting signal is applied to a field/frame converter circuit. The field/frame converter circuit includes a 0.5 H delay circuit 13 and a changeover switch 14. The changeover switch 14 is changed over every 1 H by a changeover signal $P_{SW}$. Accordingly, the field/frame converter circuit alternately outputs, every 1 H, a video signal delayed by 0.5 H and an undelayed video signal (referred to as a "through-video signal"). It should be noted that since vertical synchronization will be adversely affected if a vertical synchronizing signal $V_{sync}$ is delayed by 0.5 H, the through-video signal is outputted at all times in the vicinity of the signal $V_{sync}$.

The pseudo-frame video signal outputted by the field/frame converter circuit is applied to an A/D converter circuit 15. The A/D converter circuit 15 converts the input analog video signal into a digital signal at the timing of a clock signal (a sampling signal) provided by a clock signal generating circuit 25. The digital signal (digital image data) is written in a frame memory 16 in synchronization with the clock signal.

The pseudo-frame video signal outputted by the field/frame converter circuit is applied also to a synchronous separation circuit 17, which extracts the vertical synchronizing signal $V_{sync}$ and a horizontal synchronizing signal $H_{sync}$ from the input video signal. The horizontal synchronizing signal $H_{sync}$ is applied to a phase comparator 21 of an AFC 20.

The AFC 20, which one type of PLL circuit, is includes the phase comparator 21, the LPF 22, a voltage-controlled oscillator (hereinafter referred to as a "VCO") 23, and a 1/N frequency divider 24. The VCO 23 oscillates with a frequency $Nf_H$ (where N is a positive integer and $f_H$ is the horizontal scanning frequency) serving as its center frequency. The oscillation frequency is controlled by the output voltage of the LPF 22. The oscillatory output of the VCO 23 is applied to the phase comparator 21 after its frequency has been divided by N in the 1/N frequency divider 24. The phase comparator 21 produces a voltage signal conforming to the phase difference between the horizontal synchronizing signal $H_{sync}$ outputted by the synchronous separation circuit 17 and the output signal of the 1/N frequency divider 24, and applies this voltage signal to the LPF 22. Thus, the 1/N frequency divider 24 of the AFC 20 outputs a trigger signal synchronized to the input horizontal synchronizing signal $H_{sync}$, and the trigger signal is applied to the clock signal generating circuit 25.

Whenever the trigger signal is inputted thereto, the clock signal generating circuit 25 is reset and begins to generate the clock signal from its initial state. Since the trigger signal is in synchronism with the horizontal synchronizing signal $H_{sync}$ of the pseudo-frame video signal, at every horizontal scanning interval the clock signal generated by the clock signal generating circuit 25 is correctly timed to the beginning of the interval (the horizontal synchronizing signal $H_{sync}$). Accordingly, the A/D conversion of the video signal and the writing of the A/D-converted digital image data in the frame memory 16 also are performed at the horizontal scanning interval at a timing kept in step from the beginning of the interval.

However, as best shown in FIG. 4, the changeover of the changeover switch 14 in the field/frame converter circuit is performed before and after the vertical synchronizing signal $V_{sync}$, and therefore a problem which arises is that the horizontal synchronizing signal $H_{sync}$ tends to be lost at the time of the changeover. If the AFC 20 were to correctly follow up this loss of the horizontal synchronizing signal, then the trigger signal would fail to be produced at the portions where the horizontal synchronizing signal is missing. As a consequence, the clock signal would develop a disturbance because the clock signal generating circuit 25 would not be reset, and the timings of the video signal and clock signal applied to the A/D converter circuit 15 would no longer agree.

In accordance another embodiment of with the present invention, the time constant of the LPF 22 in the AFC 20 is set to be large in the vicinity of the vertical synchronizing signal $V_{sync}$, which tends to cause a disturbance in the horizontal synchronizing signal $H_{sync}$, in comparison with the time constant at other portions (time periods in which the effective video signal appears). As a result, the AFC 20 is strengthened against external disturbances. Even if one of the input horizontal synchronizing signals $H_{sync}$ is lost, the period up to this moment is maintained and the trigger signal is outputted reliably without being lost.

The changeover of the time constant in the LPF 22 can be realized by increasing or decreasing the number of capacitors, as shown in FIG. 2. The LPF 22 includes an operational amplifier 31, an input resistor 32, feedback resistors 33, 34 and feedback capacitors 35, 36. The feedback capacitors 35, 36 are connected in parallel. A switch 37 is connected to the capacitor 36. When the switch 37 is closed to connect the capacitor 36 in parallel with the capacitor 35, the time constant is enlarged. Opening the switch 37 cuts the capacitor 36 out of the circuit and diminishes the time constant as a result.

The control for changing over the time constant, i.e., for opening and closing the switch 37, is carried out by a changeover signal $P_{TC}$ outputted by a changeover signal generating circuit 26. A pulse generator (not shown) is provided in the vicinity of a floppy disk and generates a phase pulse PG at a rate of one pulse per revolution of the floppy disk. The arrangement is such that the pulse PG is produced slightly ahead of the vertical synchronizing signal $V_{sync}$. The phase pulse PG is inputted to the changeover signal generating circuit 26, which generates the changeover signal $P_{TC}$ for enlarging the time constant of the LPF 22 over a prescribed period of time that fully covers the vertical synchronizing signal $V_{sync}$.

The following discussion is provided in order to facilitate an understanding of the present invention. In the foregoing embodiment, an arrangement is described for solving the problem caused by loss of the horizontal synchronizing signal $H_{sync}$ accompanying the operation of the field/frame converter circuit. However, the present invention is capable also of solving a similar problem brought about by other phenomena. For example, since one field of a video signal is recorded on a floppy disk in one revolution thereof, a boundary is present in which the video signal is discontinuous, and this boundary also is in the vicinity of the vertical synchronizing signal $V_{sync}$. Noise is readily produced at the boundary where the video-signal discontinuity exists. Due to such noise, a shift can occur in the horizontal synchronizing signal $H_{sync}$ separated from the video signal, and the noise may be extracted erroneously as the horizontal synchronizing signal, or the noise may mix in with the horizontal synchronizing signal. In accordance with the present invention, the time constant of the AFC is enlarged in the vicinity of the vertical synchronizing signal $V_{sync}$. As a result, the period which prevailed up to this point can be maintained correctly without being influenced by such noise, and therefore a trigger signal exhibiting a fixed period can be produced. Since a video signal recorded on a magnetic tape likewise has a discontinuity for each field, a problem similar to that described above tends to arise. The present invention is applicable also to such a video signal read from a magnetic tape.

As many apparently widely different embodiments of the present invention can be made without departing from the spirit and scope thereof, it is to be understood that the invention is not limited to the specific embodiments thereof except as defined in the appended claims.

What is claimed is:

1. A method of writing a video signal in a memory in an apparatus in which an analog video signal read from a magnetic recording medium is converted into digital image data that is then written in the memory, wherein operation of a timing clock signal generating circuit which generates a timing clock signal for converting the video signal into the digital image data and for writing the digital image data in the memory is synchronized at every horizontal synchronizing signal separated from the video signal by application of a trigger signal, said method including the steps of:

enabling a control of a time constant of an automatic frequency control circuit, to which the horizontal synchronizing signal separated from the video signal is applied, for generating the trigger signal synchronized to the horizontal synchronization signal and applying the trigger signal to the timing clock signal generating circuit which generates the timing clock signal; and making the time constant relatively large in the vicinity of a vertical synchronizing signal of the video signal.

2. An apparatus for writing a video signal in a memory, comprising:

an A/D converter circuit for converting an analog video signal read from a magnetic recording medium into digital image data in order to be written in the memory;

a timing clock signal generating circuit for controlling A/D conversion timing of said A/D converter circuit;

a synchronous separation circuit for separating a horizontal synchronizing signal from the video signal;

an automatic frequency control circuit having a variable time constant for generating a trigger signal tuned to the horizontal synchronizing signal, which has been separated by said synchronous separation circuit, at a response speed conforming to the time constant, and resetting said timing clock signal generating circuit by said trigger signal; and control means for controlling a changeover in such a manner that the time constant of the automatic frequency control circuit is made relatively large in the vicinity of a vertical synchronizing signal of the video signal.

* * * * *